Aug. 24, 1943.　　　M. B. RATNER　　　2,327,931
METHOD AND APPARATUS FOR FORMING AIR-CELLED STEERING WHEEL CUSHIONS
Filed Nov. 16, 1939
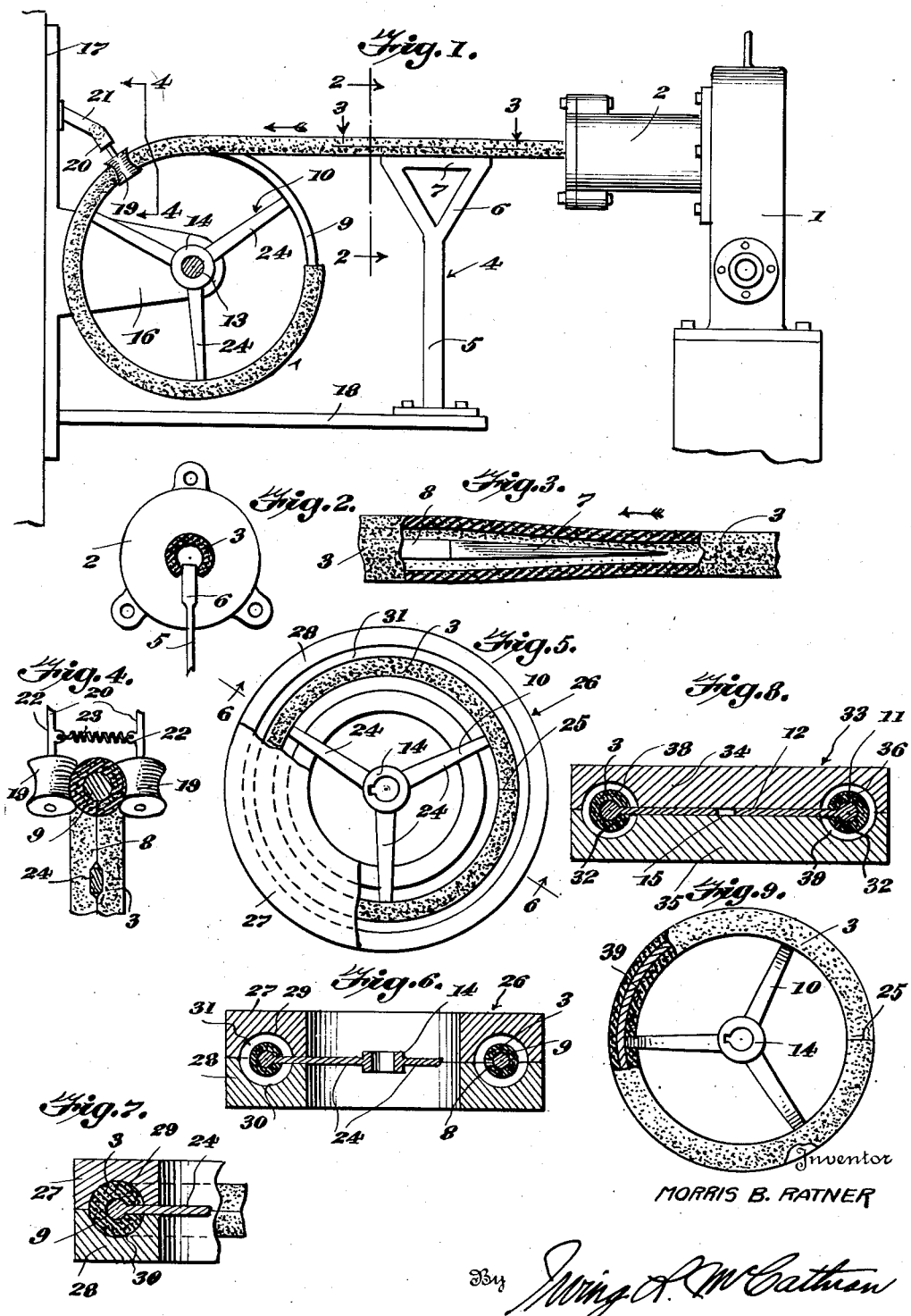
Inventor
MORRIS B. RATNER Patented Aug. 24, 1943

2,327,931

UNITED STATES PATENT OFFICE 2,327,931

METHOD AND APPARATUS FOR FORMING AIR-CELLED STEERING WHEEL CUSHIONS

Morris B. Ratner, Phoenix, Ariz., assignor to Isabelle Ratner

Application November 16, 1939, Serial No. 304,840

2 Claims. (Cl. 18—45)

This invention relates to an improved method and apparatus for forming air-celled steering wheel cushions, and it is one object to provide an improved method whereby rubber stock for forming air-celled rubber may be disposed about a steering wheel rim or the rim of a disc-like core, and then vulcanized to form the air-celled cushion.

Another object of the invention is to so apply the stock to the rim of the wheel or core that it will firmly adhere thereto during the vulcanizing and thus form a cushion of the proper dimensions and of such cross-sectional configuration that it will fit snugly in close contacting engagement with the rim of a steering wheel.

Still another object of the invention is to provide a method wherein the stock is fed from an extruding machine in tubular formation, the stock being slit longitudinally of the moving tube and spread so that it may engage about the rim of a wheel or core as the wheel or core is turned about a shaft or spindle rotatably mounting the same, the stock being cut when the wheel or core is entirely encircled thereby and the stock being pressed firmly into engagement with the rim during turning of the wheel or core. It will thus be seen that the stock will be shaped, split and applied to the wheel or core while warm and the wheel or core then transferred to a hot mould in which it will be vulcanized to form the finished cushion.

A further object of the invention is to provide an apparatus by means of which the stock may be easily and quickly formed and applied to the rim of the wheel or core in such a manner that it will adhere to the rim and form a cushion of such shape and dimensions that it will have snug fitting engagement therewith.

A still further object of the invention is to provide an apparatus wherein the stock is discharged in tubular form from an extruding machine and may be of true circular outline in cross section or have its outer or upper portion of increased thickness to compensate for wear upon these portions of the cushion.

The invention is illustrated in the accompanying drawing wherein:

Figure 1 is a view in side elevation showing the apparatus for forming the tubular stock, slitting and spreading the stock and applying the stock about a wheel or disc-like core;

Figure 2 is a section taken transversely through the split and spread stock along the line 2—2 of Figure 1;

Figure 3 is a fragmentary sectional view taken longitudinally through the stock along the line 3—3 of Figure 1;

Figure 4 is a fragmentary sectional view taken through the wheel rim along the line 4—4 of Figure 1;

Figure 5 is a view showing the wheel with the stock applied thereto, the wheel being disposed within a mold having its upper section partially broken away;

Figure 6 is a sectional view taken transversely through the mold and wheel along the line 6—6 of Figure 5;

Figure 7 is a fragmentary sectional view taken transversely through the mold with the stock expanded by heat and filling the annular cavity of the mold;

Figure 8 is a sectional view taken transversely through a mold and showing a disc-like core therein with stock about its rim to form a cushion adapted to be sold as an accessory and applied to a steering wheel already in use;

Figure 9 is a view partially in top plan and partially in section illustrating the manner in which a cushion formed as shown in Figure 8 is firmly held in place about the rim of a steering wheel when applied thereto.

When forming a cushion for a steering wheel in accordance with this invention, the sponge rubber stock is prepared either directly in the extruding machine I or in a mixer and then transferred to the extruding machine. The stock is delivered from the outlet at the outer end of the neck 2 of the extruding machine in the form of a tube 3 which may be of any diameter desired. While the tube has been shown circular in cross section and its walls of even thickness it is to be understood that the tube may be oval in cross section or any other cross-sectional outline desired. It will also be understood that portions of the tube which are to form the upper or outer peripheral portions of the cushion may have thicker walls than other portions of the tube and thus compensate for wear upon these portions of the cushion. As the tube of warm sponge rubber stock moves from the neck of the extruding machine it encounters a spreader 4 consisting of a pedestal 5 carrying at its upper end a head 6. This head 6 has an upper bar 7 which is tapered towards its front end by being gradually reduced in thickness, as shown in Figure 3, and referring to this figure it will be seen that the spreader constitutes a cutter serving to cut the tube longitudinally along is under or inner portion and form a slit 8. The slit tube moves away from the spreader for engagement about the rim 9 of a steering wheel 10 or about the rim 11 of a metal disc-like core 12.

The wheel or core must be rotatably mounted and in order to do so, there has been provided a shaft or spindle 13 for engaging through the hub 14 of the wheel or through the opening 15 at the center of the disc 12. The spindle 13 projects laterally from the bracket 16 carried by and projecting forwardly from a backing plate 17 and the backing plate also carries an arm or shelf 18 projecting forwardly from its lower end and constituting a support for the upright 5 of the spreader 4. When the sponge rubber stock is applied to the rim of the wheel or core it must be pressed into close contacting engagement therewith. In order to do so there have been provided rollers 19. These rollers which have concaved peripheral faces are rotatably mounted upon shafts or arms 20 carried by a bracket 21 projecting forwardly from the back plate 17, and in order to draw the shafts or spindles 20 towards each other the spindles are provided with perforated ears 22 extending towards each other and engaged by hooked ends of a spring 23. The spring exerts pull upon the shafts or spindles to draw the same towards each other and cause the rollers to engage the split tube of sponge rubber stock and press the same firmly about the rim of the wheel or core as shown in Figure 4 where the tube is shown in close contacting engagement with the rim of the wheel for the entire circumference thereof. By applying pressure to the stock during turning of the wheel the inner surface of the stock will have close contacting engagement with the rim and in addition edge faces of the stock will be brought into face-to-face engagement with each other except at the spokes 24 where they have close fitting engagement with the spokes as shown in Figure 4. After the wheel or disc-like core has been turned about the spindle 13 a sufficient distance to cause the entire rim to be covered with the sponge rubber stock, the stock is cut to sever the applied portion of the stock from the slit tubular stock and ends of the applied portion of the stock are pressed into close contacting engagement with each other as shown at 25 in Figure 5. It will thus be seen that the rim will be entirely enclosed in the stock.

After the stock has been applied to the rim the wheel is removed from the spindle and placed in a mold. This mold 26 consists of upper and lower annular sections 27 and 28 formed with registering recesses 29 and 30 defining an annular chamber 31 of cross-sectional area conforming to the desired contour and external dimensions of the cushion to be formed. The mold is heated to a hot temperature before the wheel carrying the rubber stock is placed therein and this causes a quick blowing of the sponge rubber stock to take place when the wheel rim carrying the rubber stock is enclosed in the chamber 31. Therefore, the sponge rubber stock will be caused to adhere to the rim and remain in close fitting engagement therewith during vulcanizing of the rubber. While the stock has been referred to as sponge rubber stock it is of such consistency that it forms a very porous rubber which may be designated properly air-celled rubber, the cells at the inner surface of the cushion constituting vacuum cups which assist in holding the cushion in close fitting engagement with the wheel rim. The stock is initially spaced from walls of the chamber 31, as shown in Figure 6, but during vulcanizing the stock expands and completely fills the chamber as shown in Figure 7, and pressure will be applied to hold the stock snuggle about the rim and spokes of the wheel. After the stock has been vulcanized the mold is opened and the wheel removed. The cushion of air-celled rubber adheres to the rim and forms a soft yielding surface which can be easily grasped and held by a person driving an automobile or other vehicle equipped with a steering wheel. This cushion is applied directly to the rim of the steering wheel as a permanent fixture and remains thereon until worn out.

The cushion shown in Figures 8 and 9 instead of being formed directly upon the rim of a steering wheel is manufactured about the rim 11 of a disc-like core 12 and after being vulcanized is to be removed and sold as an accessory to be applied to the rim of a steering wheel already in use. When manufacturing this form of cushion the core 12 is applied to the spindle and the split stock disposed about its rim 11. In view of the fact that the cushion is to be removed from the core after vulcanizing, the stock has a lubricant applied to its inner surface as well as to its outer surface instead of merely to its outer surface as is the case when forming the cushion directly upon the rim of a steering wheel. In view of the fact that the inner surface of the stock is lubricated it will have a tendency to drop away from the under portion of the core when the core is placed in the mold. Therefore, the rim 11 carries a plurality of pins or spurs 32 spaced from each other about the circumference of the rim of the core. These pins or spurs are embedded in the stock as the stock passes between the rollers 19 and serve very effectively to firmly hold the stock in close fitting engagement with the rim 11. The mold 33 is similar in construction to the mold 26 and has upper and lower sections 34 and 35 formed with registering annular recesses 36 and 37 defining a circular chamber 38, but the two sections of this mold are of solid formation instead of having the sections of annular formation to provide a center opening through the mold. After the stock is vulcanized in the mold, the mold is opened and the core removed therefrom, the cushion being then stripped from the core. The cushion so formed is of the proper dimensions to fit snugly about the rim of a steering wheel but in order to cause the cushion to adhere and remain firmly in place about the wheel rim tire tape or the like is wrapped about the wheel rim, as shown at 39 before the cushion is applied and cemented in place. It will thus be seen that in accordance with this invention a cushion of air-celled rubber may be formed directly about the rim of a steering wheel or formed about the rim of a core and removed from the core for sale as an accessory to be applied to a steering wheel already in use. In either case the method consists of forming the stock into a tube, slitting the tube longitudinally and spreading the slit tube, applying the spread tube about an annular rim of a form, pressing the tube tightly about the rim in close fitting engagement therewith, placing the form in a hot mold, and subjecting the mold to heat to expand the stock in the mold and form an air-celled cushion, and removing the form and the finished cushion from the mold. In the embodiment of the invention wherein the cushion is formed about the rim of a disc-like core instead of directly about the rim of a steering wheel the final step consists of stripping the cushion from the core, and in this embodiment of the invention an important step consists of firmly anchoring the stock to the rim 11 by means of the pins 32 so that when the core is placed in the mold the under portion of the stock will be maintained in close contacting engagement with the rim during vulcanizing to form a cushion of air-celled rubber which will be of the proper dimensions and cross-sectional outline to fit snugly about the rim of a steering wheel when applied thereto.

Having described the invention, what I claim as new is:

1. The method of forming a steering wheel cushion comprising the placing of split tubular sponge rubber stock to and around a circular ring-like form to completely enclose the form, anchoring the stock to the under face of the form to prevent separation of the stock away from the form during blowing of the stock while the stock is subjected to a high temperature, then pressing the stock upon the form for ejecting air from between the stock and form, then placing the stock and form within a hot mold in spaced relation with respect to the walls of the mold in a manner whereby an instantaneous blowing of the stock will take place while the stock is firmly anchored against sagging movement away from the lower face of the form, and then subjecting the mold to a greater heat to expand and vulcanize the tubular stock to the capacity of the mold.

2. A core for supporting sponge rubber stock within a heated mold and away from the walls of the mold comprising a ring-like body, stock-retaining pins spaced from each other about the outer face of the body of the core, said pins radiating from the under face of the ring-like body at an incline to the transverse axis of the core and adapted to engage sponge rubber stock for holding the stock firmly in engagement with the under face of the body of the core and preventing the sponge rubber stock from dropping away from the core when the sponge rubber stock is subjected to the action of a high temperature.

MORRIS B. RATNER.